United States Patent Office 3,140,111
Patented July 7, 1964

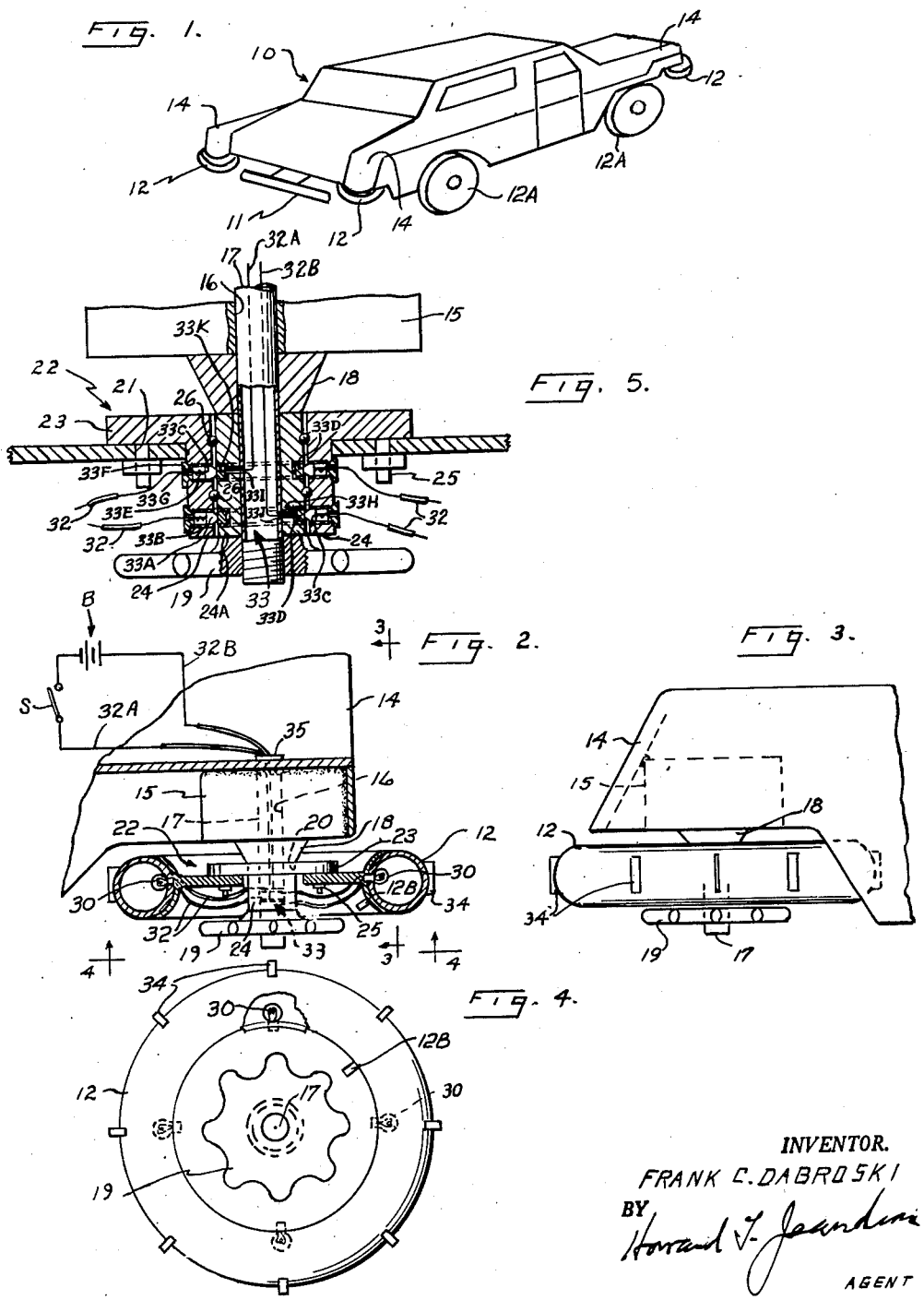

3,140,111
ILLUMINATED ROTATABLE RESILIENT BUMPER
Frank C. Dabroski, 63 Lower Main St., Matawan, N.J.
Filed Dec. 16, 1960, Ser. No. 76,332
2 Claims. (Cl. 293—17)

This is a continuation in part of Serial No. 761,814, filed September 18, 1958, now abandoned. This invention relates to an automobile fender bumper and more particularly to a method of affixing to each fender bumper a rotatably mounted wheel having a translucent tire with a light or lights enclosed.

The prior art discloses rotatably mounted wheels acting as deflecting bumpers in the Morrison Patent No. 2,196,225 and in the Torino (Italian) Patent No. 429,783. However in both of these patents it is a single wheel mounted in the center of rear of the car and in the center of the front of the car. Therefore although the rollaway bumper may deflect the car to the right or left in the event of collision or may deflect a car colliding with the rear of the car to the right or left in every instance the car proper may be protected but the fenders have no protection whatsoever. Also shown in the prior art are various mountings for small rollers such as in Millman 2,935,330 in which the small rollers are attached to the sides of a food carrying cart. The rollers do not protect the cart as it is simply a tubular frame, rather the rollers protect the counters and fixtures within the store or supermarket to prevent a preponderance of scratches and gouges that would normally accumulate due to the misuse of the carts. Again in this instance the small roller has nothing whatsoever to do with the protection of a fender as in this invention. Various attempts have been made to provide clearance lights for vehicles that are not easily damaged, in some instances the lights are recessed to prevent breakage in the event of collision, other lights are covered with a reinforced or armored cage to prevent damage. In all the prior art instances the lights are stationary.

It is an object of this invention to provide an automobile fender bumper that is comprised of a spare tire in which the spare tire is mounted horizontally to said fender and in which the spare tire is positioned to protrude on the outside of the fender to protect the fender from collision.

It is a further object of this invention to provide an automobile fender bumper that comprises a wheel with a translucent tube mounted horizontally to said fender and in which the wheel is positioned so that the tube protrudes on the outside of the fender to protect the fender from collision.

It is a further object of this invention to provide an automobile fender bumper that is comprised of a resiliently covered wheel that is proportioned to the fender in which it is to be mounted and in which the wheel is mounted horizontally to said fender and in which the wheel is positioned to protrude on the outside of the fender to protect the fender from collision.

A still further object of this invention is to provide an automobile fender bumper and clearance light that is comprised of a wheel with a translucent tube in which a light or lights are mounted and in which the wheel is mounted horizontally to said fender and in which the wheel is positioned so that the tube protrudes on the outside of the fender to protect the fender from collision and to provide illumination to indicate the points of clearance.

Further objects of this invention may be apparent by reference to the accompanying detailed description and the drawings in which FIG. 1 illustrates a perspective view of an automobile incorporating this invention, FIG. 2 is a detail view partially in cross section illustrating the mounting of a spare wheel and tire according to this invention, FIG. 3 is a side elevational view taken on line 3—3 of FIG. 2, FIG. 4 is a plan view taken on line 4—4 of FIG. 2, and FIG. 5 is a detail in cross section showing the construction of the mounting.

Referring to the drawings and particularly FIG. 1, there is illustrated a perspective view of an automobile 10. The bumper construction of the automobile has been modified, that is, although a small section of the stationary bumper 11 may be utilized, both ends of the bumper 11 have been eliminated and in their place there are provided a pair of rotary supported wheels 12. The wheels 12 are mounted on a stub shaft, as shown in FIGS. 2 and 5, so that they are freely rotatable, and so that the periphery of the wheel extends beyond the outline of the fender 14. The wheels 12 may, of course, be a special wheel formed with a rubber surface, plastic surface or other flexible material, be inflated to give a cushioning effect, but in each instance the protruding surface of the wheel shall be of a continuous area that will provide a sliding or cushioning surface for any object that shall collide with the surface of the wheel. The rotatable bumper wheels 12 have inflating valves 12B which may also be additional spare wheels for the vehicle supporting wheels 12A; since many of the cars are now using small wheels there is ample space, especially in many of the new designs, to permit mounting a small wheel as shown at one side of a fender, front or rear, without affecting the normal design of the car.

Referring to FIG. 2, there is illustrated partially in cross section one form of mounting for the wheel 12 described in FIG. 1. The fender 14 of the automobile 10 may be provided as formed or by welding at the desired positions a reinforcing block 15 and a bore 16 provided in block 15, to permit mounting a stub shaft 17. Shaft 17 will extend downward from block 15 below the fender 14. A spacer 18 may be mounted under the fender to retain wheel 12 in a spaced relation from fender 14. The wheel 12 is positioned through bearing block 22 on the stub shaft 17 and is retained in a rotatable position by means of an adjustable threaded element 19.

In the event the wheel 12 is a spare tire and wheel for the car, the average automobile wheel is provided with a central aperture 20 and a plurality of tire lug apertures 21. Since the aperture 20 would not provide a proper bearing surface, a bearing block 22 is provided. Block 22 has a flange 23 which fits on one side of the wheel, a spindle 24A, and a hub 24 which will pass through aperture 20, and the flange 23 is provided with a plurality of lug bolts 25 that are spaced to match with the apertures 21. Thus, the bearing block 22 may be mounted in a wheel as illustrated in FIG. 5, and the wheel is then ready to be mounted on the stub shaft 17, and once the wheel has been placed in juxtaposition with the spacer 18, element 19 may be threadably secured to retain the bearing block 22 in a fixed relation, thus permitting the wheel to freely rotate about spindle 24A due to the bearings 26.

Referring to FIGS. 2, 4, and 5 there is also illustrated a plurality of light bulbs 30 which may be mounted in a socket that is in turn mounted in a small bore in the rim of the wheel thus extending into the tire. The lights are connected by leads 32 to a brush and slip ring arrangement 33 mounted in hub 24 and spindle 24A respectively of bearing block 22. The brushes 33A are mounted in hub 24 with insulation 33B between the brush 33A and the hub 24. The leads 32 are secured at 33C to the brushes 33A which are maintained in contact with the slip or contact rings 33D by a spring 33E which is held in the bearing block 22 by a spring retaining means 33F having an aperture 33G through which the leads 32 pass. The contact rings 33D are in turn mounted in spindle 24A with insulation 33H between the slip rings and the spindle 24A. The wires 32A and 32B are positioned within the shaft 17, with the wire 32A extending through a bore 33I in the shaft 17 and spindle 24A while the wire 32B passes through bore 33J in the shaft 17 and the spindle 24A. The wires 32A and 32B are secured to the appropriate slip ring 33D at 33K. The wires 32A and 32B extend from the slip rings 33D through the respective bores 33I and 33J of spindle 24A and shaft 17 to the outlet 35 (FIG. 2) at the top of shaft 17 where they may be connected through the fender to a proper connection for operation of the lights. The lighting circuit is shown schematically in FIG. 2 and is comprised of a pair of wires 32A and 32B that are in turn connected to battery B and switch S. It is apparent in this instance that with the light bulbs 30 connected to the power supply that the light bulbs 30 will be illuminated and in the particular form of this invention in which the tube is formed of a translucent material the illumination of the bulbs will form a complete circle of illumination which will be visible at each of the extreme corners or clearance points for the car. It may be desirable to cause the wheels 12 to rotate when the car is in motion, this may be produced by adding a plurality of flaps 34 to the exterior surface of the tubular element. The wind resistance of the flaps 34 will produce a desired rotation of the wheel. Of course this invention lends itself to various combinations, that is, the wheels mounted in the rear fenders would naturally be provided with red lights while the front fender mounted wheels would probably be provided with green lights; other colors may be used as desired. Likewise the translucent tubular element may be a continuous translucent material or may be provided with stripes or designs or may be provided with lettering as desired. The particular covering material used for the wheels 12 may also vary, that is, a spare tire may be utilized in other instances where the wheel is designed considerably smaller to fit the contour of the fender it may be a rubber tire and in the instances in which the wheel is to serve as a clearance light as well the tubular element must be translucent to permit the light to project through the tubular element. The material best suited for the translucent tube may be any one of the tough plastics such as polyethylene to insure good cushioning as well as the translucent effect.

Although the design of the bumper illustrated is specifically a front or rear bumper for the fenders of an automobile it shall not be limited to this exact design of vehicle; it may be similarly applied to the extreme overhanging corners of a truck or trailer without departing from the spirit of this invention. Likewise although the particular mounting of the wheel has been illustrated as a quick easily demountable form, the wheel may be permanently mounted or mounted in a different manner without departing from the spirit of this invention and although the particular form of wheel illustrated is similar to a spare tire it may take a broader tread form or general shape of a barrell without departing from the spirit of this invention and although I have illustrated and described, a translucent tube as a further form, the form may also include any clear plastic material as long as it has the qualities necessary to include it as a bumper. Other changes may be made without departing from the spirit of this invention and this invention shall be limited only by the appended claims.

What is claimed is:

1. A vehicle fender having an unattached protruding edge which includes:
    (a) a rotatable resilient bumper,
    (b) and in which said fender is provided with a reinforcing block affixed under its protruding edge,
    (c) said block supporting a rigid stub shaft,
    (d) said stub shaft provided with a bearing and means to retain said bearing on said stub shaft,
    (e) said bearing supporting a wheel,
    (f) said wheel having a rim and a resilient inflated covering supported thereon,
    (g) a major portion of said wheel protruding beyond the edge of said fender to provide a resilient rolling bumper guard for said fender.

2. A vehicle fender having an unattached protruding edge which includes
    (a) a rotatable resilient bumper,
    (b) and in which said fender is provided with a reinforcing block affixed under its protruding edge,
    (c) said block supporting a rigid stub shaft,
    (d) said stub shaft provided with a bearing and means to retain said bearing on said stub shaft,
    (e) said bearing supporting a wheel,
    (f) said wheel having a rim and a resilient inflated covering supported thereon,
    (g) said resilient covering for said wheel comprised of a translucent material and
    (h) said wheel provided with a plurality of lights mounted entirely within said resilient covering,
    (i) said lights illuminated by the closing of a switch that is in turn connected to a battery to project the illumination from said lights through said translucent material.

References Cited in the file of this patent

UNITED STATES PATENTS

| | | |
|---|---|---|
| 1,214,031 | Heim | Jan. 30, 1917 |
| 1,277,582 | Heim | Sept. 3, 1918 |
| 1,647,014 | Pattison | Oct. 25, 1927 |
| 1,794,018 | Homan | Feb. 24, 1931 |
| 1,948,578 | Hasley | Feb. 27, 1934 |
| 1,960,668 | Fackiner | May 29, 1934 |
| 2,196,225 | Morrison | Apr. 9, 1940 |
| 2,274,440 | Tozier | Feb. 24, 1942 |
| 2,525,001 | Sherwood | Oct. 10, 1950 |
| 2,642,591 | Craver | June 23, 1953 |
| 2,668,902 | Fisher | Feb. 9, 1954 |
| 2,730,396 | Johnson | Jan. 10, 1956 |
| 2,935,330 | Millman | May 3, 1960 |

FOREIGN PATENTS

| | | |
|---|---|---|
| 18,789 of 1910 | Great Britain | May 25, 1911 |
| 451,392 | Great Britain | Aug. 5, 1936 |
| 238,522 | Germany | Sept. 27, 1911 |
| 429,783 | Italy | Feb. 3, 1948 |